(12) United States Patent
Matsushita (10) Patent No.: US 12,021,556 B2
(45) Date of Patent: Jun. 25, 2024

(54) COMMUNICATION DEVICE

(71) Applicant: TOSHIBA TEC KABUSHIKI KAISHA, Tokyo (JP)

(72) Inventor: Naohiro Matsushita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 17/888,291

(22) Filed: Aug. 15, 2022

(65) Prior Publication Data

US 2023/0137527 A1 May 4, 2023

(30) Foreign Application Priority Data

Nov. 1, 2021 (JP) ................................. 2021-178511

(51) Int. Cl.
  *H04K 3/00* (2006.01)
  *H04B 1/38* (2015.01)
  *H04B 1/56* (2006.01)

(52) U.S. Cl.
  CPC ...................... *H04B 1/56* (2013.01)

(58) Field of Classification Search
  CPC ... H04B 1/10; H04B 1/38; H04B 1/40; H04B 1/56; H04B 1/7097; H04B 1/7103; H04B 1/711; H04B 2001/7152; H04B 1/525
  See application file for complete search history.

(56) References Cited

U.S. PATENT DOCUMENTS

| 8,013,715 B2 * | 9/2011 | Chiu ........................ H04Q 9/00 340/10.5 |
| 8,260,241 B1 * | 9/2012 | Hyde ................. G06K 7/10158 455/296 |
| 8,744,377 B2 * | 6/2014 | Rimini .................... H04B 1/525 455/296 |

FOREIGN PATENT DOCUMENTS

JP  2010-102530 A  5/2010

* cited by examiner

*Primary Examiner* — Tuan Pham
(74) *Attorney, Agent, or Firm* — FOLEY & LARDNER LLP (57) ABSTRACT

A communication device according to an embodiment includes a first generator, a second generator, a signal sharer, a combiner, a first measurement circuit, a second measurement circuit, a first control circuit, a second control circuit, and a third control circuit. The first and second measurement circuits measure levels of self-jammer signals, respectively. Each of the self-jammer signals is extracted in corresponding one of a first bandwidth and a second bandwidth larger than the first bandwidth from a signal output from the combiner. The first control circuit sets change values of an amplitude and a phase in the second generator during a period of a first time width. The second control circuit sets change values of the amplitude and the phase in the second generator. The third control circuit causes the first control unit to set the change values of the amplitude and the phase in the second generator.

10 Claims, 4 Drawing Sheets

COMMUNICATION DEVICE

CROSS-REFERENCE TO RELATED APPLICATION

This application is based upon and claims the benefit of priority from Japanese Patent Application No. 2021-178511, filed on Nov. 1, 2021, the entire contents of which are incorporated herein by reference.

FIELD

Embodiments described herein relate to a communication device.

BACKGROUND

In a communication device that shares an antenna for transmission and reception, a part of a transmission signal may be superimposed on a reception signal and flow into a reception system. A component of the transmission signal superimposed on the reception signal becomes a self-jammer signal, which may cause a decrease in communication quality due to saturation of the reception system and an increase in noise.

DETAILED DESCRIPTION

In a typical communication device, a cancellation signal whose phase is opposite to a phase of the self-jammer signal is generated from the transmission signal, and the self-jammer signal is canceled by using the cancellation signal.

Typically, a gain and a phase shift amount or value for generating the cancellation signal are appropriately set before communication starts. During the communication, the self-jammer signal is canceled by a cancellation signal generated based on the gain and the phase shift amount or value set before the communication starts. Such a process is referred to as a self-jammer cancellation process, and is hereinafter abbreviated as SJC control.

During the communication, however, the self-jammer signal may fluctuate due to a change in a surrounding environment of the antenna. The self-jammer signal remaining after the cancellation may become louder when the self-jammer signal fluctuates significantly.

It is desired that an influence of the self-jammer signal can be reduced even when the self-jammer signal fluctuates during the communication.

In general, according to one embodiment, a communication device capable of reducing an influence of a self-jammer signal even when the self-jammer signal fluctuates during communication is provided.

A communication device according to an embodiment includes a first generation unit or first generator, a shared unit or signal sharer, a second generation unit or second generator, a combining unit or combiner, a first measurement unit or first measurement circuit, a first control unit or first control circuit, a second measurement unit or second measurement circuit, a second control unit or second control circuit, and a third control unit or third control circuit. The communication device includes one or more control circuits that may include one processor or multiple processors. The first generation unit or first generator is configured to generate a transmission signal for wireless transmission. The shared unit or signal sharer is configured to receive the transmission signal generated by the first generation unit from an input terminal, output the transmission signal from an input and output terminal, and output, from an output terminal, a signal input from the input and output terminal. The second generation unit or second generator is configured to generate a cancellation signal by changing an amplitude and a phase of the transmission signal generated by the first generation unit. The combining unit or combiner is configured to combine the cancellation signal generated by the second generation unit with the signal output from the output terminal. The first measurement unit or first measurement circuit is configured to measure a level of a self-jammer signal extracted in a first bandwidth from a combined signal or a signal output from the combining unit. The first control unit or first control circuit is configured to set change amounts or values of an amplitude and a phase in the second generation unit so as to reduce the level measured by the first measurement unit to a level satisfying a predetermined condition during a period of a predetermined first time width. The second measurement unit or second measurement circuit is configured to measure a level of a self-jammer signal extracted in a second bandwidth wider than the first bandwidth from the combined signal or signal output from the combining unit. The second control unit or second control circuit is configured to control change amounts or values of the amplitude and the phase in the second generation unit so as to reduce the level measured by the second measurement unit during a period of a second time width shorter than the first time width, in response to an increase in the level measured by the second measurement unit. The third control unit or third control circuit is configured to cause the first control unit to set the change amounts or values of the amplitude and the phase in the second generation unit before start of reception of a response signal transmitted from a partner device, and cause the second control unit to set the change amounts or values of the amplitude and the phase in the second generation unit during the reception of the response signal transmitted from the partner device.

Hereinafter, embodiments will be described with reference to the drawings. In the following, a reading device that reads data stored in a radio frequency identification (RFID) tag will be described as an example. The reading device is an example of a communication device that wirelessly communicates with the RFID tag as a partner device when reading the data.

Figure 1:
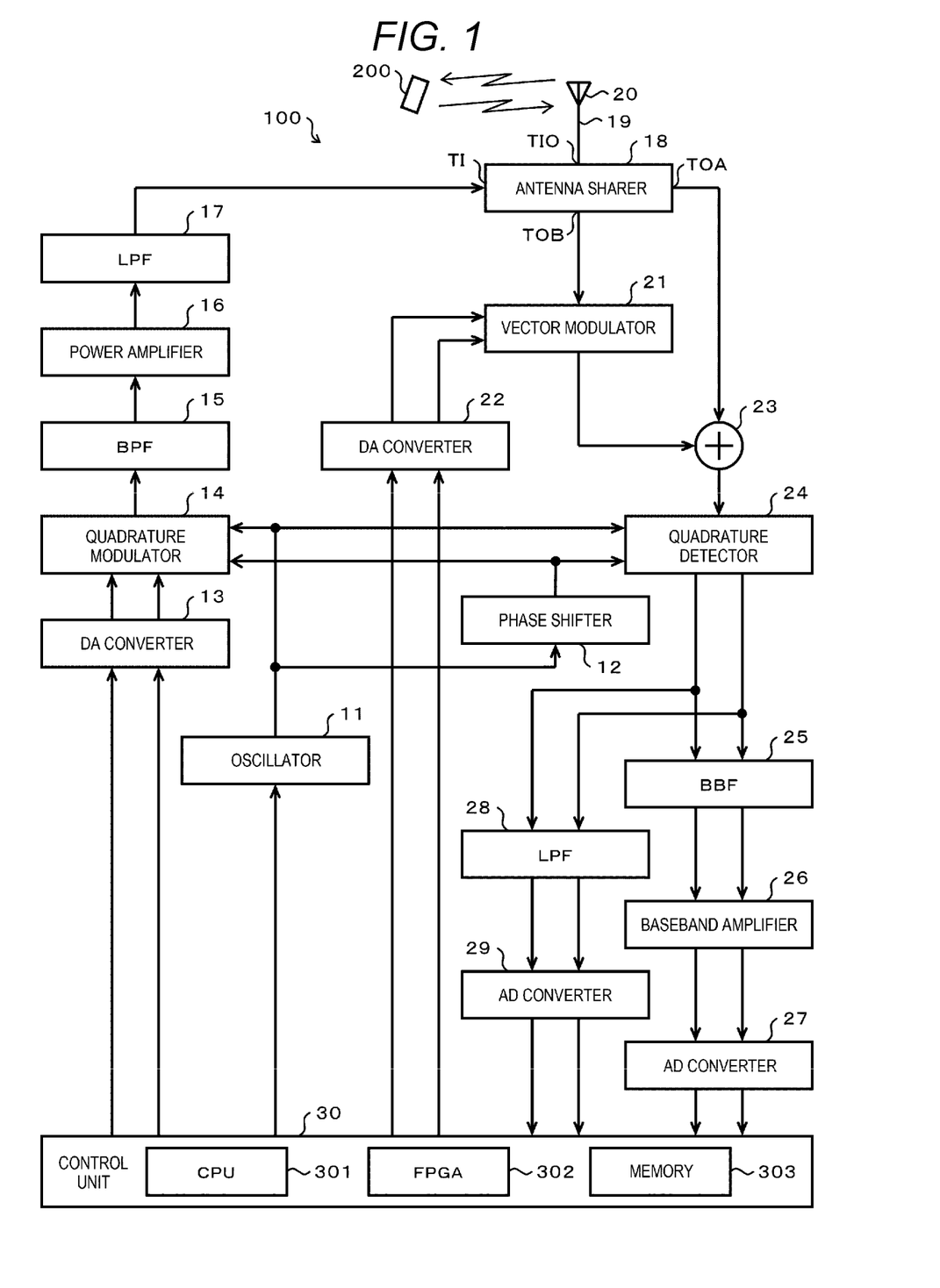
FIG. 1 is a block diagram showing a circuit configuration of main parts of a reading device according to an embodiment.

FIG. 1 is a block diagram showing a circuit configuration of main parts of a reading device or reader 100 according to the present embodiment.

The reading device 100 includes an oscillator 11, a phase shifter 12, a digital to analog (DA) converter 13, a quadrature modulator 14, a band-pass filter (BPF) 15, a power amplifier 16, a low-pass filter (LPF) 17, an antenna sharer 18, a feed line 19, an antenna 20, a vector modulator 21, a DA converter 22, a power combiner 23, a quadrature detector 24, a baseband filter (BBF) 25, a baseband amplifier 26, an analog to digital (AD) converter 27, an LPF 28, an AD converter 29, and a control unit or control circuit 30. The control unit 30 includes a CPU 301, a field-programmable gate array (FPGA) 302, and a memory 303. The antenna 20 may not be included in the reading device 100, and any antenna may be connected to the feed line 19. In addition, the antenna 20 and the feed line 19 may not be included in the reading device 100, and any feed line to which any antenna is connected may be connected to the antenna sharer 18.

The oscillator 11 generates a sine wave having a predetermined frequency as a carrier wave.

The phase shifter 12 shifts a phase of the carrier wave generated by the oscillator 11 by 90 degrees to output a cosine wave as another carrier wave.

The DA converter 13 converts two groups of transmission baseband signals output from the CPU 301 in a digital state into analog signals.

The quadrature modulator 14 receives, as modulated waves, the two groups of transmission baseband signals converted into the analog signals by the DA converter 13. The quadrature modulator 14 receives the carrier wave generated by the oscillator 11 and the carrier wave output from the phase shifter 12. Then, the quadrature modulator 14 obtains a transmission signal by quadrature modulation using the two groups of modulated waves and the two groups of carrier waves.

The BPF 15 removes a low frequency component and a high frequency component due to band limitation from the transmission signal obtained by the quadrature modulator 14.

The power amplifier 16 amplifies the transmission signal that passes through the BPF 15 to a level suitable for wireless transmission.

The LPF 17 removes a harmonic component from the transmission signal amplified by the power amplifier 16.

By the processes in the BPF 15, the power amplifier 16, and the LPF 17, the transmission signal becomes a signal for the wireless transmission. That is, the BPF 15, the power amplifier 16, and the LPF 17 constitute a first generation unit or first generator that generates the transmission signal for the wireless transmission.

The antenna sharer 18 includes an input terminal TI, an input and output terminal TIO, an output terminal TOA, and an output terminal TOB. The transmission signal that passes through the LPF 17 is input to the input terminal TI. The antenna sharer 18 outputs, from the input and output terminal TIO and the output terminal TOB, the transmission signal input to the input terminal TI. The antenna sharer 18 outputs, from the output terminal TOA, a signal input to the input and output terminal TIO. The signal output from the output terminal TOA of the antenna sharer 18 is a signal obtained by combining a reception signal generated in the antenna 20 and a self-jammer signal to be described later. This signal is simply referred to as a reception signal below. The antenna sharer 18 is an example of a shared unit or signal sharer.

The feed line 19 supplies, to the antenna 20, the transmission signal output from the input and output terminal TIO of the antenna sharer 18. The feed line 19 transmits the reception signal generated in the antenna 20 to the input and output terminal TIO of the antenna sharer 18.

The antenna 20 radiates a radio wave corresponding to the transmission signal supplied from the feed line 19. The antenna 20 generates an electric signal corresponding to an incoming radio wave as the reception signal.

The vector modulator 21 modulates the transmission signal output from the output terminal TOB of the antenna sharer 18 such that the transmission signal becomes a signal having an amplitude and a gain corresponding to a vector represented by two groups of control signals (hereinafter referred to as an I control signal and a Q control signal) supplied from the DA converter 22. The transmission signal modulated by the vector modulator 21 is hereinafter referred to as a cancellation signal. That is, the vector modulator 21 generates the cancellation signal by changing the amplitude and the phase of the transmission signal, and corresponds to a second generation unit or second generator.

The DA converter 22 converts, into analog signals, the I control signal and the Q control signal output from the control unit 30 in a digital state to obtain the I control signal and the Q control signal to be supplied to the vector modulator 21.

The power combiner 23 combines the cancellation signal output from the vector modulator 21 with the reception signal output from the output terminal TOA of the antenna sharer 18. As a result, the power combiner 23 reduces the self-jammer signal included in the reception signal. The power combiner 23 is an example of a combining unit or combiner.

The quadrature detector 24 executes quadrature detection on the reception signal output from the power combiner 23 using the two carrier waves respectively output from the oscillator 11 and the phase shifter 12. The quadrature detector 24 outputs, in parallel, two groups of analog-state reception baseband signals obtained by the quadrature detection. That is, the quadrature detector 24 is an example of a wave detector.

The BBF 25 extracts a predetermined baseband component from each of the two groups of reception baseband signals output from the quadrature detector 24. A pass band of the BPF 25 includes a band including a response signal from an RFID tag 200.

The baseband amplifier 26 amplifies each of the two groups of reception baseband signals that pass through the BBF 25 to a level suitable for digitization by the AD converter 27.

The AD converter 27 digitizes the two groups of reception baseband signals amplified by the baseband amplifier 26.

The LPF 28 extracts low-frequency band signals corresponding to components of the self-jammer signals that are respectively included in the two groups of reception baseband signals output from the quadrature detector 24. Each of the signals extracted by the LPF 28 includes the component of the self-jammer signal remaining in the output of the power combiner 23. The two groups of signals extracted by the LPF 28 are hereinafter referred to as an I residual signal and a Q residual signal.

The AD converter 29 digitizes the I residual signal and the Q residual signal output from the LPF 28.

In communication with the RFID tag 200, the CPU 301 outputs the two groups of transmission baseband signals in accordance with a predetermined sequence. The CPU 301 reconstructs data sent from the RFID tag 200 based on the two groups of reception signals digitized by the AD converter 27.

The FPGA 302 executes signal processing programmed in advance to execute various high-speed calculation associated with information processing executed by the CPU 301. One of functions of the FPGA 302 is a function of controlling the vector modulator 21 based on the I residual signal and the Q residual signal that are digitized by the AD converter 29.

The memory 303 stores an information processing program described for information processing to be executed by the CPU 301. The memory 303 stores various types of data required for the CPU 301 to execute various types of information processing. The memory 303 stores various types of data generated or acquired when the CPU 301 executes various types of information processing.

Figure 2:
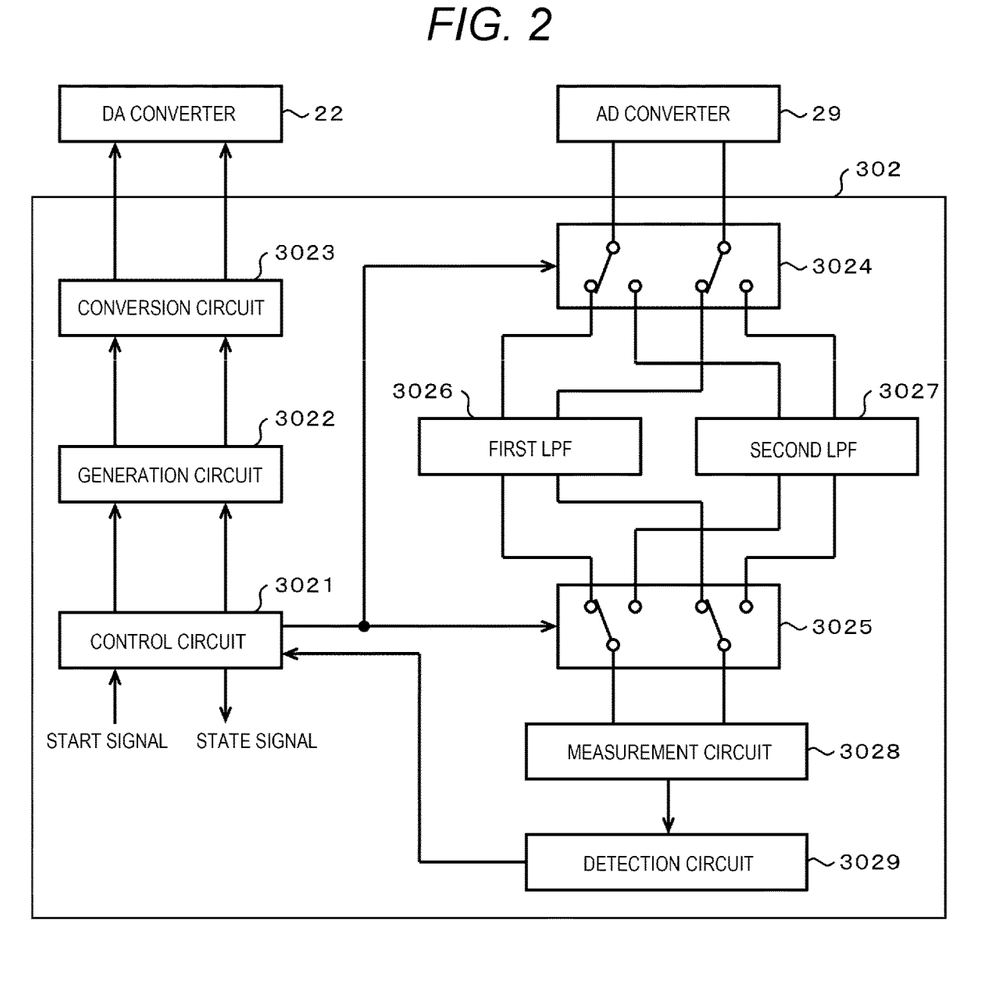
FIG. 2 is a block diagram showing a configuration of a circuit built in an FPGA for control of an SJC process.

FIG. 2 is a block diagram showing a configuration of a circuit built in the FPGA 302 for control of an SJC process.

As shown in FIG. 2, the circuit built in the FPGA 302 includes a control circuit 3021, a generation circuit 3022, a conversion circuit 3023, selectors 3024 and 3025, a first LPF 3026, a second LPF 3027, a measurement circuit 3028, and a detection circuit 3029.

When the CPU 301 gives a start signal for instructing execution of the SJC process, the control circuit 3021 executes a process for realizing the SJC process (hereinafter, referred to as a control process), which will be described later. The control circuit 3021 instructs the generation circuit 3022 to start scanning in the control process. The control circuit 3021 controls the selectors 3024 and 3025 in the control process. In the control process, the control circuit 3021 sets the amplitude and the phase of the cancellation signal according to an amplitude minimum point detected by the detection circuit 3029. The control circuit 3021 outputs a state signal for notifying the CPU 301 of an execution state of the SJC process.

The generation circuit 3022 generates, in a digital state, a phase signal and an amplitude signal respectively indicating the amplitude and the phase of the cancellation signal. The generation circuit 3022 sequentially changes the phase signal and the amplitude signal such that amplitudes and phases in a scan period are swept. The generation circuit 3022 fixes the phase signal and the amplitude signal so that the amplitude and the phase are constant in a period other than the scan period.

The conversion circuit 3023 converts the phase signal and the amplitude signal supplied from the generation circuit 3022 into the I control signal and the Q control signal. The I control signal and the Q control signal represent, in a digital state, the vector corresponding to the phase and the amplitude that are represented by the phase signal and the amplitude signal. The I control signal and the Q control signal obtained by the conversion circuit 3023 are supplied to the DA converter 22.

The selectors 3024 and 3025 alternatively validate the first LPF 3026 and the second LPF 3027 under control of the control circuit 3021. Then, the selector 3024 supplies the I residual signal and the Q residual signal output from the AD converter 29 to the valid one of the first LPF 3026 and the second LPF 3027. The selector 3025 supplies the I residual signal and the Q residual signal that pass through the valid one of the first LPF 3026 and the second LPF 3027 to the measurement circuit 3028.

The first LPF 3026 and the second LPF 3027 all pass low frequency components of the I residual signal and the Q residual signal. As a result, the first LPF 3026 and the second LPF 3027 attenuate an unnecessary signal component that lowers measurement accuracy of the measurement circuit 3028. The characteristics of the first LPF 3026 and the second LPF 3027 may be appropriately determined by, for example, a designer of the reading device 100. However, a cutoff frequency of the first LPF 3026 is set smaller than that of the second LPF 3027. As a result, the first LPF 3026 has a capability of attenuating the unnecessary signal component higher than that of the second LPF 3027. For example, a finite impulse response (FIR) filter can be used as the first LPF 3026 and the second LPF 3027.

The first LPF 3026 is an example of a first filter, and the second LPF 3027 is an example of a second filter.

Figure 3:
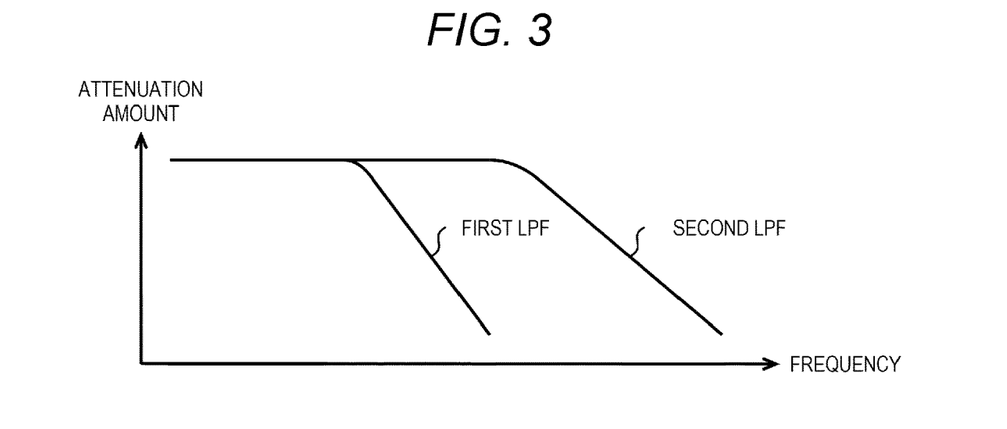
FIG. 3 is a diagram showing frequency characteristics of a first LPF and a second LPF.

FIG. 3 is a diagram showing frequency characteristics of the first LPF 3026 and the second LPF 3027.

As shown in FIG. 3, the cutoff frequency of the first LPF 3026 is smaller than that of the second LPF 3027. The first LPF 3026 has an order larger than that of the second LPF 3027. As a result, as shown in FIG. 3, the first LPF 3026 has an inclination of an attenuation amount or value larger than an inclination of an attenuation amount or value of the second LPF 3027.

The measurement circuit 3028 measures an amplitude of the residual signal (hereinafter referred to as a residual level) based on the I residual signal and the Q residual signal supplied from the selector 3025.

The detection circuit 3029 detects a timing at which the residual level measured by the measurement circuit 3028 is minimized (hereinafter referred to as the amplitude minimum point). Then, the detection circuit 3029 notifies the control circuit 3021 of the detected amplitude minimum point.

Next, an operation of the reading device 100 including the above configurations will be described. The operation for reading the RFID tag 200 may be, for example, another known operation using a quadrature modulation scheme as a modulation scheme for wireless communication. Therefore, here, the description of the operation is omitted, and an operation relating to the SJC process will be described.

The self-jammer signal will be described before describing the operation.

The antenna sharer 18 is designed such that the transmission signal input to the input terminal TI is not output from the output terminal TOA. In an actual circuit configuration, however, it is difficult to completely prevent the transmission signal input to the input terminal TI from leaking from the output terminal TOA. Therefore, a part of the transmission signal input to the input terminal TI is output from the output terminal TOA as it is. A part of the transmission signal output from the input and output terminal TIO of the antenna sharer 18 is reflected at a feed point of the antenna 20 and transmitted to the antenna sharer 18 by the feed line 19. Such a reflected signal is output from the output terminal TOA by a function of the antenna sharer 18. Thus, a signal output from the output terminal TOA of the antenna sharer 18 includes a component of the transmission signal leaked without being output from the input and output terminal TIO and a component of the transmission signal input as the reflected signal to the input and output terminal TIO. The self-jammer signal is a signal obtained by combining the components of the transmission signal. A reflection characteristic of the transmission signal at the feed point of the antenna 20 changes depending on an environment around the antenna 20, such as how close the RFID tag 200 and other objects are to the antenna 20. Therefore, an amplitude and a phase of the signal reflected at the feed point of the antenna 20 also fluctuate depending on the environment around the antenna 20. Due to this influence, an amplitude and a phase of the self-jammer signal also fluctuate depending on the environment around the antenna 20.

The environment around the antenna 20 is mainly influenced by an article attached with the RFID tag 200. The environment around the antenna 20 is influenced by a table on which the article attached with the RFID tag 200 is placed. Therefore, as a separation distance between the antenna 20 and the RFID tag 200, that is, a communication distance becomes smaller, a stability of the environment around the antenna 20 tends to be lower.

The self-jammer signal is a signal derived from the transmission signal. Therefore, by changing the amplitude and the phase of a signal branched from the transmission signal, it is possible to generate a signal having the same frequency and amplitude but having an opposite phase with respect to the self-jammer signal. Then, by combining such a signal with the reception signal output from the output terminal TOA of the antenna sharer 18, the self-jammer signal included in the reception signal can be canceled out. In the reading device 100, the cancellation signal obtained by changing the amplitude and the phase by the vector modulator 21 is combined, by the power combiner 23, with the reception signal output from the output terminal TOA of the antenna sharer 18, thereby reducing the self-jammer signal included in the reception signal.

The reading device 100 is used, for example, to read the data from the RFID tag 200 attached to an article placed at a predetermined position in a warehouse. Therefore, an operator carrying the reading device 100 moves to the front of a shelf, and causes the reading device 100 to read the RFID tag 200 attached to the article placed on the shelf. One of operation modes at this time is a mode in which the operator is in the front of the shelf and holds the reading device 100 toward the shelf to read the RFID tag 200 located in a relatively wide range. Another mode of the operation modes is a mode in which the operator holds the reading device 100 close to the RFID tag 200 placed on the shelf to read the RFID tag 200 in the vicinity. A communication distance between the reading device 100 and the RFID tag 200 in the former operation mode is larger than that in the latter operation mode. Therefore, the operation mode of the reading device 100 adapted to a long communication distance as the former operation mode is referred to as a "long-distance mode". The operation mode of the reading device 100 adapted to a short communication distance such as the latter operation mode is referred to as a "short-distance mode". The long-distance mode corresponds to a first communication mode, and the short-distance mode corresponds to a second communication mode.

When the reading of the RFID tag 200 should be started, the CPU 301 starts outputting a predetermined transmission baseband signal such that a radio wave radiated from the antenna 20 becomes a non-modulated carrier wave. In addition, the CPU 301 starts supplying the start signal to the control circuit 3021.

Upon receiving the start signal, the control circuit 3021 starts the control process for the SJC process.

Figure 4:
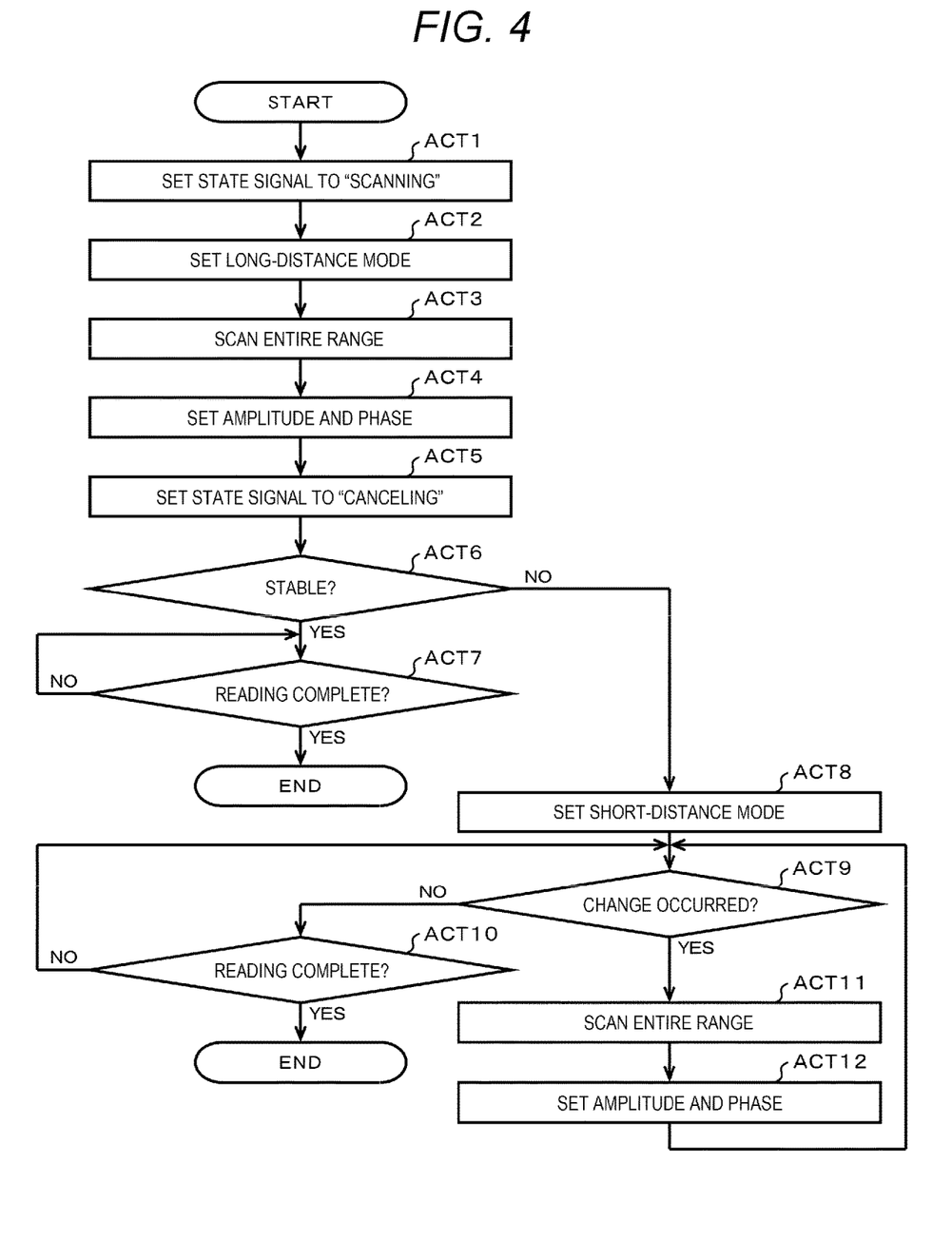
FIG. 4 is a flowchart of a control process executed by a control circuit.

FIG. 4 is a flowchart of the control process.

In ACT 1, the control circuit 3021 sets the state signal to a state indicating "scanning".

In ACT 2, the control circuit 3021 sets the long-distance mode. At this time, the control circuit 3021 causes the selectors 3024 and 3025 to select the first LPF 3026, for example.

In ACT 3, the control circuit 3021 starts scanning an entire range. For example, the control circuit 3021 instructs the generation circuit 3022 to start sweeping. In response to this instruction, the generation circuit 3022 starts generating and outputting the amplitude signal and the phase signal. After that, the generation circuit 3022 sequentially changes states of the amplitude signal and the phase signal such that the amplitude and the phase indicated by the amplitude signal and the phase signal are sequentially changed over an entire range in which the amplitude and the phase are changeable in the vector modulator 21. As a result, the gain and the phase of the cancellation signal generated by the vector modulator 21 are gradually changed. A period from the start of the output of the amplitude signal and the phase signal by the generation circuit 3022 to the end of the change over the entire range in which the amplitude and the phase are changeable is the scan period for scanning the entire range.

In the scan period, a reduction amount or value of the self-jammer signal is sequentially changed by combining the cancellation signal by the power combiner 23. Therefore, the I residual signal and the Q residual signal extracted by the LPF 28 are also sequentially changed. The I residual signal and the Q residual signal are input to the measurement circuit 3028 through the first LPF 3026. The measurement circuit 3028 measures the residual level based on the I residual signal and the Q residual signal that are changed as described above. The detection circuit 3029 detects the amplitude minimum point, that is, the timing at which the residual level measured by the measurement circuit 3028 is minimized in the scan period. However, the amplitude minimum point is not necessarily the strict timing at which the residual level is minimized, and may be a timing at which the residual level becomes sufficiently low to a value close to the minimum value. The degree of the value of the residual level when the amplitude minimum point is detected may be determined freely by, for example, a designer of the reading device 100.

At this time, the level of the self-jammer signal extracted by the first LPF 3026 as the first filter is measured by the measurement circuit 3028, and thus the first LPF 3026 and the measurement circuit 3028 constitute a first measurement unit or first measurement circuit.

In ACT 4, the control circuit 3021 sets, as the amplitude and the phase in a period other than the scan period, an amplitude and a phase for reproducing an operation state of the vector modulator 21 at the amplitude minimum point detected by the detection circuit 3029. Then, the control circuit 3021 instructs the generation circuit 3022 to fix the amplitude and the phase. Then, the generation circuit 3022 fixes the amplitude signal and the phase signal to be generated and output to a state in which the amplitude signal and the phase signal represent the instructed amplitude and the phase. In response to this, the vector modulator 21 is set to a state of generating the cancellation signal capable of favorably canceling the self-jammer signal in a current surrounding environment. Through this process, the control circuit 3021 functions as a first control unit or first control circuit.

In ACT 5, the control circuit 3021 sets the state signal to a state indicating "canceling". Then, the CPU 301 starts outputting, in a predetermined sequence, the transmission baseband signal for radiating the radio wave from the antenna 20 in order to read the RFID tag 200.

In ACT 6, the control circuit 3021 confirms whether the surrounding environment is stable. For example, the control circuit 3021 calculates a stability of the residual level measured by the measurement circuit 3028 within a predetermined period, and confirms whether the surrounding environment is stable based on the stability. The stability can be calculated, for example, as a difference between a maximum value and a minimum value. In this case, a smaller value of the stability indicates a more stable surrounding environment. Therefore, it is considered that the control circuit 3021 may determine that the surrounding environment is stable, for example, when the stability is equal to or smaller than a predetermined first threshold value. If the surrounding environment is stable, the control circuit 3021 determines YES and proceeds to ACT 7. The first threshold value may be appropriately determined by, for example, the designer of the reading device or reader 100.

In ACT 7, the control circuit 3021 waits for completion of the reading.

When the reading of all the RFID tags 200 that should be read is completed, the CPU 301 notifies the control circuit 3021 of the completion of the reading. For example, the CPU 301 notifies the control circuit 3021 of the completion of the reading by stopping the supply of the start signal to the control circuit 3021. In this case, the CPU 301 continues supplying the start signal started when the reading should be started as described above. Then, for example, the control circuit 3021 determines YES in ACT 7 when the completion is notified as described above, and ends the control process.

Meanwhile, for example, when the stability is not equal to or smaller than the first threshold value, the control circuit 3021 determines NO in ACT 6, which indicates that the surrounding environment is not stable, and proceeds to ACT 8.

In ACT 8, the control circuit 3021 sets the short-distance mode. At this time, the control circuit 3021 causes the selectors 3024 and 3025 to select the second LPF 3027, for example.

Thus, by executing the processes of ACT 6 and ACT 8, the control circuit 3021 functions as a setting unit or setting circuit.

In ACT 9, the control circuit 3021 confirms whether the surrounding environment changes. If the control circuit 3021 cannot confirm the corresponding event, the control circuit 3021 determines NO and proceeds to ACT 10.

In ACT 10, the control circuit 3021 confirms whether the reading is completed. If the control circuit 3021 cannot confirm the corresponding event, the control circuit 3021 determines NO and returns to ACT 9.

Thus, in ACT 9 and ACT 10, the control circuit 3021 waits for the change in environment or the completion of the reading.

At this time, since the operation of the vector modulator 21 is fixed, the residual level fluctuates according to the fluctuation of the self-jammer signal. Therefore, for example, when the residual level becomes equal to or larger than a predetermined second threshold value, the control circuit 3021 determines YES, which indicates that the environment changes, and proceeds to ACT 11. The second threshold value may be appropriately determined by, for example, the designer of the reading device 100.

In ACT 11, the control circuit 3021 starts scanning the entire range similar to that in ACT 3. Here, the short-distance mode is set, and the second LPF 3027 is selected by the selectors 3024 and 3025. Since the cutoff frequency of the second LPF 3027 is larger than that of the first LPF 3026, a time constant of the second LPF 3027 is smaller than that of the first LPF 3026. That is, a response speed related to the measurement of the residual level in the entire range scan in ACT 11 is higher than that in the entire range scan in ACT 3. Therefore, in ACT 11, the control circuit 3021 changes the amplitude and the phase of the cancellation signal at a time interval shorter than that in ACT 3. The time interval for changing the amplitude and the phase in each of ACT 3 and ACT 11 may be appropriately determined by, for example, the designer of the reading device 100, such that the residual level can be measured normally by the measurement circuit 3028 in consideration of the response speeds of the first LPF 3026 and the second LPF 3027.

At this time, the level of the self-jammer signal extracted by the second LPF 3027 as the second filter is measured by the measurement circuit 3028, and thus the second LPF 3027 and the measurement circuit 3028 constitute a second measurement unit or second measurement circuit.

Since the cutoff frequency of the second LPF 3027 is larger than that of the first LPF 3026, an SN ratio of the I residual signal and the Q residual signal supplied to the measurement circuit 3028 in the entire range scan in ACT 11 is larger than that in the entire range scan in ACT 3. As a result, an error of the residual level measured by the measurement circuit 3028 in the entire range scan in ACT 11 is larger than that in the entire range scan in ACT 3. That is, an error of the amplitude minimum point detected by the detection circuit 3029 in the entire range scan in ACT 11 is larger than that in the entire range scan in ACT 3.

In ACT 12, the control circuit 3021 sets an amplitude and a phase of the vector modulator 21 in the same manner as in ACT 4. Through this process, the control circuit 3021 functions as a second control unit or second control circuit.

After that, the control circuit 3021 returns to a standby state of ACT 9 and ACT 10. Thus, the control circuit 3021 repeats the entire range scan in ACT 11 and the setting of the amplitude and the phase in ACT 12 each time the surrounding environment changes, until the reading is completed. The control circuit 3021 determines YES in ACT 10 when the completion is notified from the CPU 301, and ends the control process.

Figure 5:
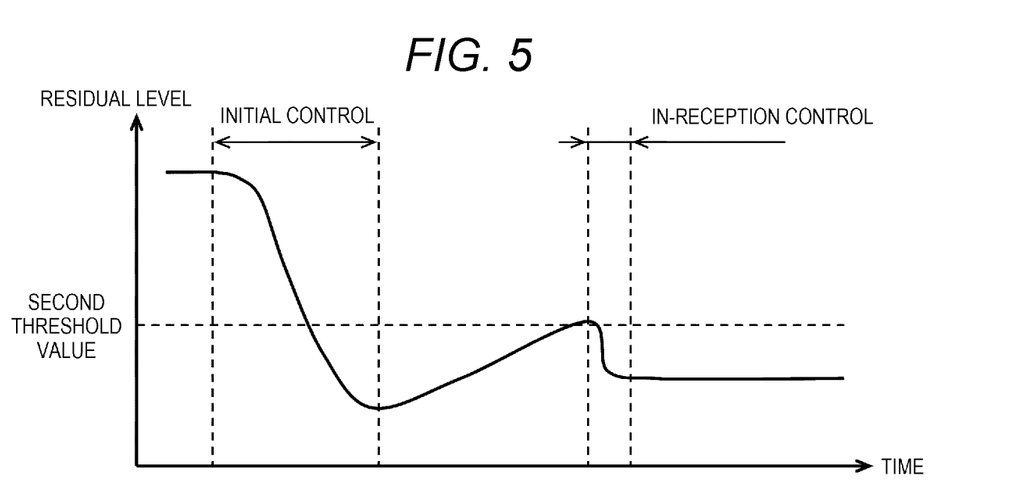
FIG. 5 is a diagram showing an example of a change in a residual level measured by a measurement circuit.

FIG. 5 is a diagram showing an example of a change in the residual level measured by the measurement circuit 3028.

As shown in FIG. 5, the residual level is reduced to a sufficiently small value over a relatively long time by the control to the vector modulator 21 in ACT 3 and ACT 4 (hereinafter, referred to as initial control).

In the example of FIG. 5, after completion of the initial control, the residual level gradually increases depending on the change in the surrounding environment. The control to the vector modulator 21 in ACT 11 and ACT 12 (hereinafter, referred to as in-reception control) is executed in response to the residual level becoming equal to or larger than the second threshold value. By the in-reception control, the residual level is reduced to smaller than the second threshold value again. However, due to an influence of the detection error of the amplitude minimum point as described above, the residual level after the in-reception control is larger than the residual level after the initial control.

As described above, the control circuit 3021 executes the initial control by the function as the first control unit before the start of the reception, and executes the in-reception control by the function as the second control unit during the reception, and thus functions as a third control unit or third control circuit.

According to the above operation, in the reading device 100, the residual level is also monitored during reception. When the residual level increases, the vector modulator 21 is readjusted while the reception operation is continued. Therefore, the influence of the self-jammer signal can be reduced even when the self-jammer signal fluctuates during communication due to the influence of the change in the surrounding environment or the like.

The reading device 100 executes the entire range scan in the in-reception control in a short period of time with reduced accuracy. Therefore, a state in which the residual level is large can be eliminated in the short period of time, and the influence of the self-jammer signal can be reduced.

Further, the reading device 100 executes the in-reception control only when the residual level after completion of the initial control is not stable. In a case where the residual level after the completion of the initial control is stable, it is considered that an object that causes the change in the surrounding environment is not close to the antenna 20. In this case, it is known that the fluctuation of the self-jammer signal is small. Therefore, in such a situation, an increase in a process load due to the in-reception control can be prevented by not executing the in-reception control.

In addition, the reading device 100 switches between the long-distance mode using the first LPF 3026 to adapt to a relatively large communication distance and the short-distance mode using the second LPF 3027 to adapt to a relatively small communication distance, according to the stability of the residual level after the completion of the initial control. The reading device 100 executes the initial control in the long-distance mode, and executes the in-reception control only in the short-distance mode. Thus, it is possible to switch operation states in which the initial control and the in-reception control are respectively executed by switching operation modes adapted to the change in the communication distance.

This embodiment can be variously modified as follows.

The disclosure can be realized as a communication device that communicates with the RFID tag 200 in order to write in the RFID tag 200. The disclosure can also be realized as a communication device that communicates with a communication device different from the RFID tag 200.

The in-reception control may be executed when the residual level after the completion of the initial control is stable, that is, when the communication in the long-distance mode is executed.

The cancellation signal may be generated without using the vector modulator 21. For example, a variable attenuator and a variable phase shifter may be connected in series instead of the vector modulator 21.

An LPF capable of changing the cut-off frequency may be used instead of the selectors 3024 and 3025, the first LPF 3026, and the second LPF 3027.

Although several embodiments are described, these embodiments are presented as examples and are not intended to limit the scope of the invention. These novel embodiments can be implemented in various other forms, and various omissions, substitutions, and changes may be made without departing from the spirit of the invention. These embodiments and the modifications thereof are included in the scope and the spirit of the disclosure and are also included in the disclosure described in the claims and an equivalent scope thereof.

What is claimed is:

1. A communication device, comprising:
a first generator configured to generate a transmission signal for wireless transmission;
a signal sharer configured to receive the transmission signal generated by the first generator from an input terminal, output the transmission signal from an input and output terminal, and output, from an output terminal, a signal input from the input and output terminal;
a second generator configured to generate a cancellation signal by changing an amplitude and a phase of the transmission signal generated by the first generation unit;
a combiner configured to combine the cancellation signal with the signal output from the output terminal, and output a combined signal; and
one or more control circuits configured as:
a first measurement circuit configured to measure a level of a self-jammer signal extracted in a first bandwidth from the combined signal;
a first control circuit configured to set change values of an amplitude and a phase in the second generator, to thereby reduce the level measured by the first measurement circuit to satisfy a predetermined condition during a period of a predetermined first time width;
a second measurement circuit configured to measure a level of a self-jammer signal extracted in a second bandwidth wider than the first bandwidth from the combined signal;
a second control circuit configured to control the change values of the amplitude and the phase in the second generator, to thereby reduce the level measured by the second measurement circuit during a period of a second time width shorter than the first time width, in response to an increase in the level measured by the second measurement circuit; and
a third control circuit configured to cause the first control circuit to set the change values of the amplitude and the phase in the second generator before start of reception of a response signal transmitted from a partner device, and cause the second control circuit to set the change values of the amplitude and the phase in the second generator during the reception of the response signal transmitted from the partner device.

2. The device according to claim 1, wherein
the first measurement circuit comprises a first filter configured to pass a signal component in the first bandwidth, and
the second measurement circuit comprises a second filter configured to pass a signal component in the second bandwidth and has a response speed higher than that of the first filter.

3. The device according to claim 1, wherein
in response to a stability degree of the self-jammer signal before the start of the reception of the response signal transmitted from the partner device being low enough to satisfy a predetermined condition, the third control circuit validates the control by the second control circuit during the subsequent reception.

4. The device according to claim 1, wherein
the communication device has operation modes comprising a first communication mode and a second communication mode adapted to a communication distance shorter than that in the first communication mode, and
the third control circuit is configured to validate the control by the second control circuit in response to the second communication mode being set.

5. The device according to claim 4, further comprising:
a setting circuit configured to set the second communication mode in response to a stability degree of the self-jammer signal before the start of the reception of the response signal transmitted from the partner device being low enough to satisfy a predetermined condition.

6. A method for operating a communication device, the method comprising:
generating, by a first generator, a transmission signal for wireless transmission;
receiving, by a signal sharer, the transmission signal generated by the first generator from an input terminal;
outputting, by the signal sharer, the transmission signal from an input and output terminal;
outputting, by the signal sharer, from an output terminal, a signal input from the input and output terminal;

generating, by a second generator, a cancellation signal by changing an amplitude and a phase of the transmission signal generated by the first generator;

combining, by a combiner, the cancellation signal with the signal output from the output terminal, and output a combined signal;

measuring, by one or more control circuits configured as a first measurement circuit, a level of a self-jammer signal extracted in a first bandwidth from the combined signal;

setting, by the one or more control circuits configured as a first control circuit, change values of an amplitude and a phase in the second generator, to thereby reduce the level measured by the first measurement circuit to satisfy a predetermined condition during a period of a predetermined first time width;

measuring, by the one or more control circuits configured as a second measurement circuit, a level of a self-jammer signal extracted in a second bandwidth wider than the first bandwidth from the combined signal;

controlling, by the one or more control circuits configured as a second control circuit, the change values of the amplitude and the phase in the second generator, to thereby reduce the level measured by the second measurement circuit during a period of a second time width shorter than the first time width, in response to an increase in the level measured by the second measurement circuit;

causing, by the one or more control circuits configured as a third control circuit, the first control circuit to set the change values of the amplitude and the phase in the second generator before start of reception of a response signal transmitted from a partner device; and causing, by the one or more control circuits configured as a third control circuit, the second control circuit to set the change values of the amplitude and the phase in the second generator during the reception of the response signal transmitted from the partner device.

7. The method according to claim 6, wherein:

measuring by the first measurement circuit further comprises passing, by a first filter, a signal component in the first bandwidth, and measuring by the second measurement circuit further comprises passing, by a second filter, a signal component in the second bandwidth, wherein the second measurement circuit has a response speed higher than that of the first filter.

8. The method according to claim 6, further comprising:

validating, by the third control circuit, the control by the second control circuit during the subsequent reception in response to a stability degree of the self-jammer signal before the start of the reception of the response signal transmitted from the partner device being low enough to satisfy a predetermined condition.

9. The method according to claim 6, further comprising:

providing the communication device configured to operate in a first communication mode and a second communication mode adapted to a communication distance shorter than that in the first communication mode, and validating, by the third control circuit, the control by the second control circuit in response to the second communication mode being set.

10. The method according to claim 9, further comprising:

setting, by a setting circuit, the second communication mode in response to a stability degree of the self-jammer signal before the start of the reception of the response signal transmitted from the partner device being low enough to satisfy a predetermined condition.

* * * * *